Figure 1:
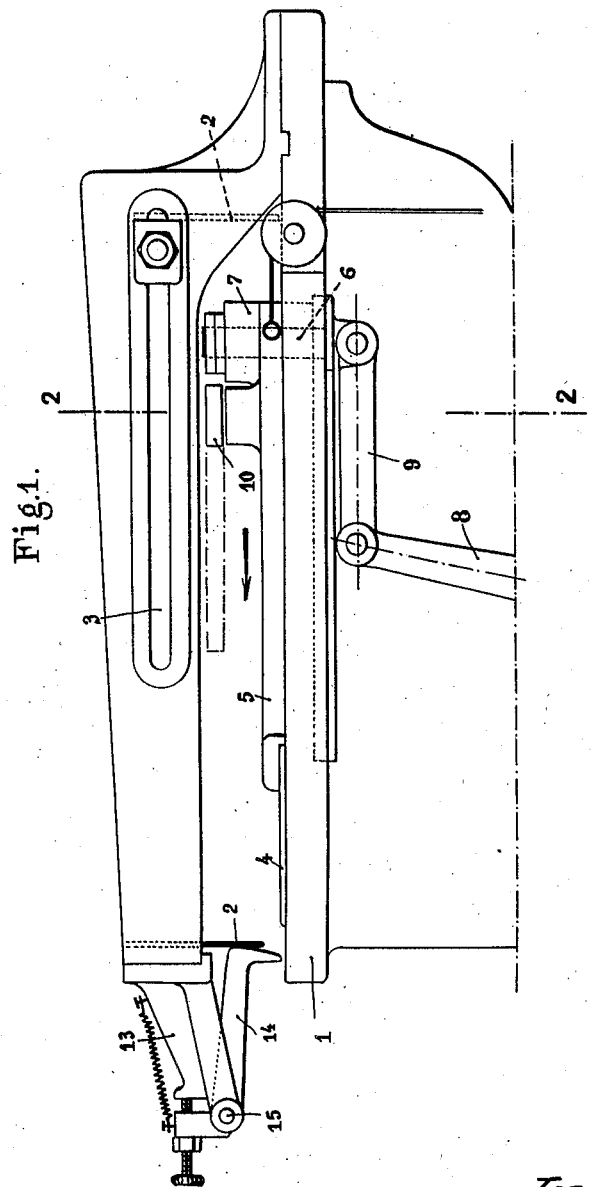

Sept. 14, 1926.

J. M. R. DUPLAY 1,599,993

PRINT WRAPPING MACHINE

Filed Sept. 8, 1924

17 Sheets-Sheet 3

Inventor
J. M. R. Duplay
by Langner, Perry, Card & Langner
Attys.

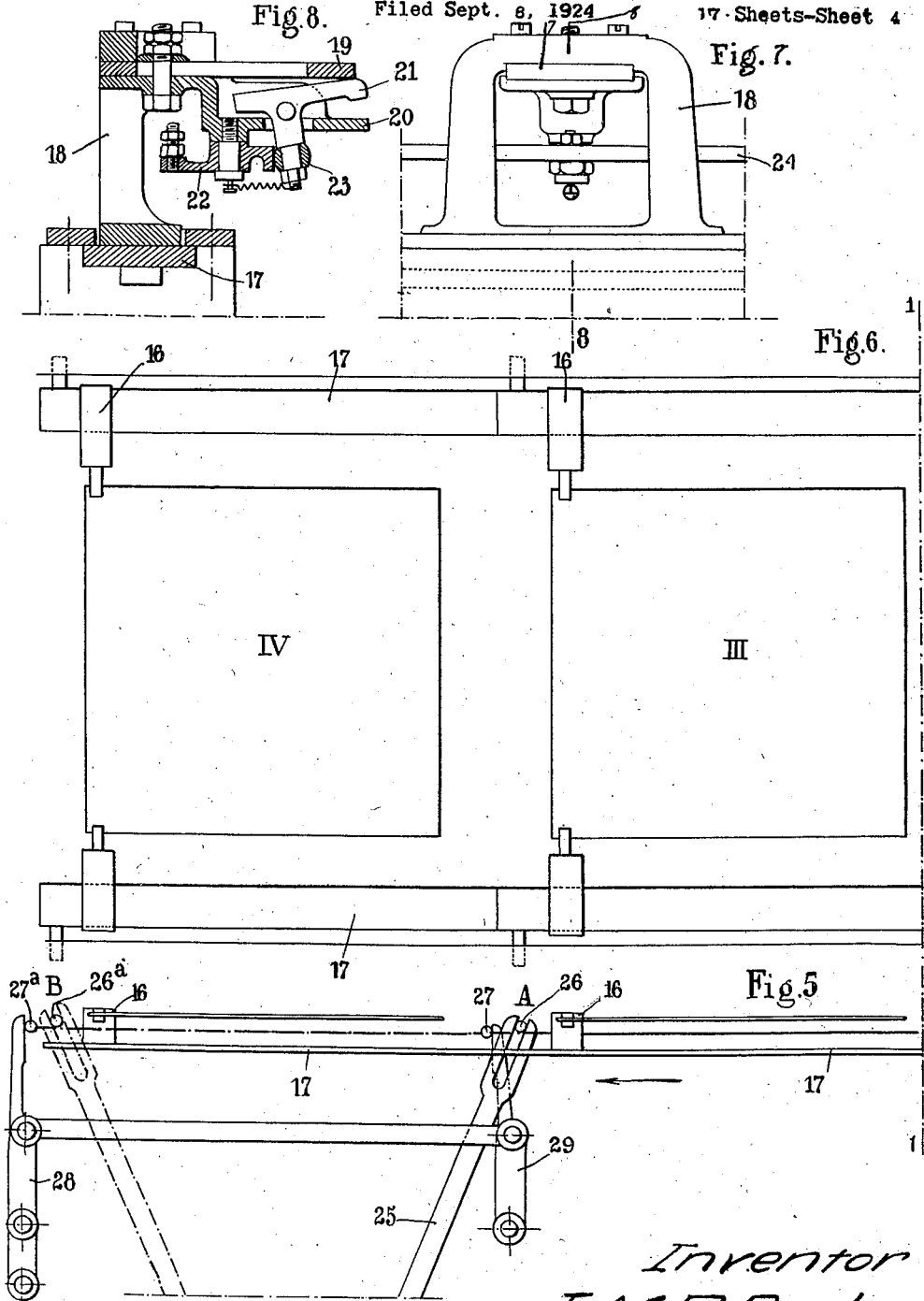

Sept. 14, 1926.
J. M. R. DUPLAY
1,599,993
PRINT WRAPPING MACHINE
Filed Sept. 8, 1924
17 Sheets-Sheet 5
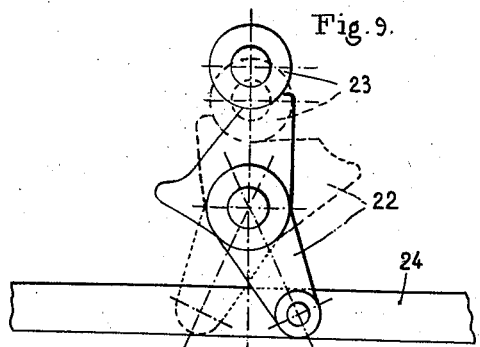
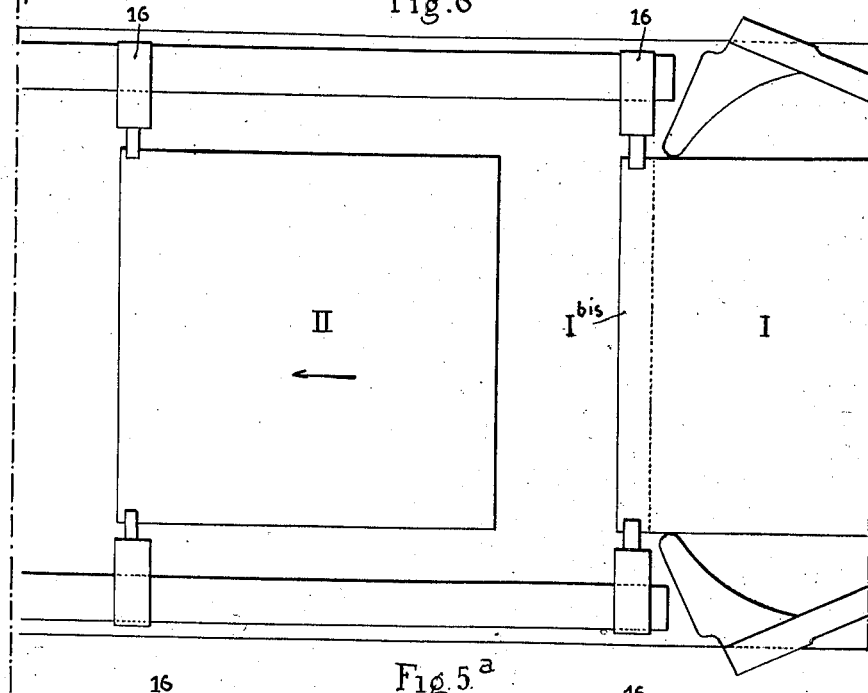
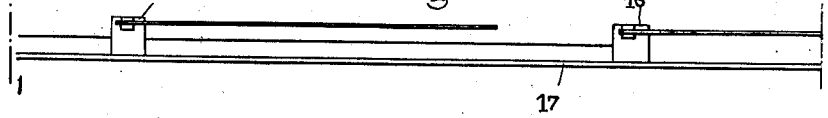

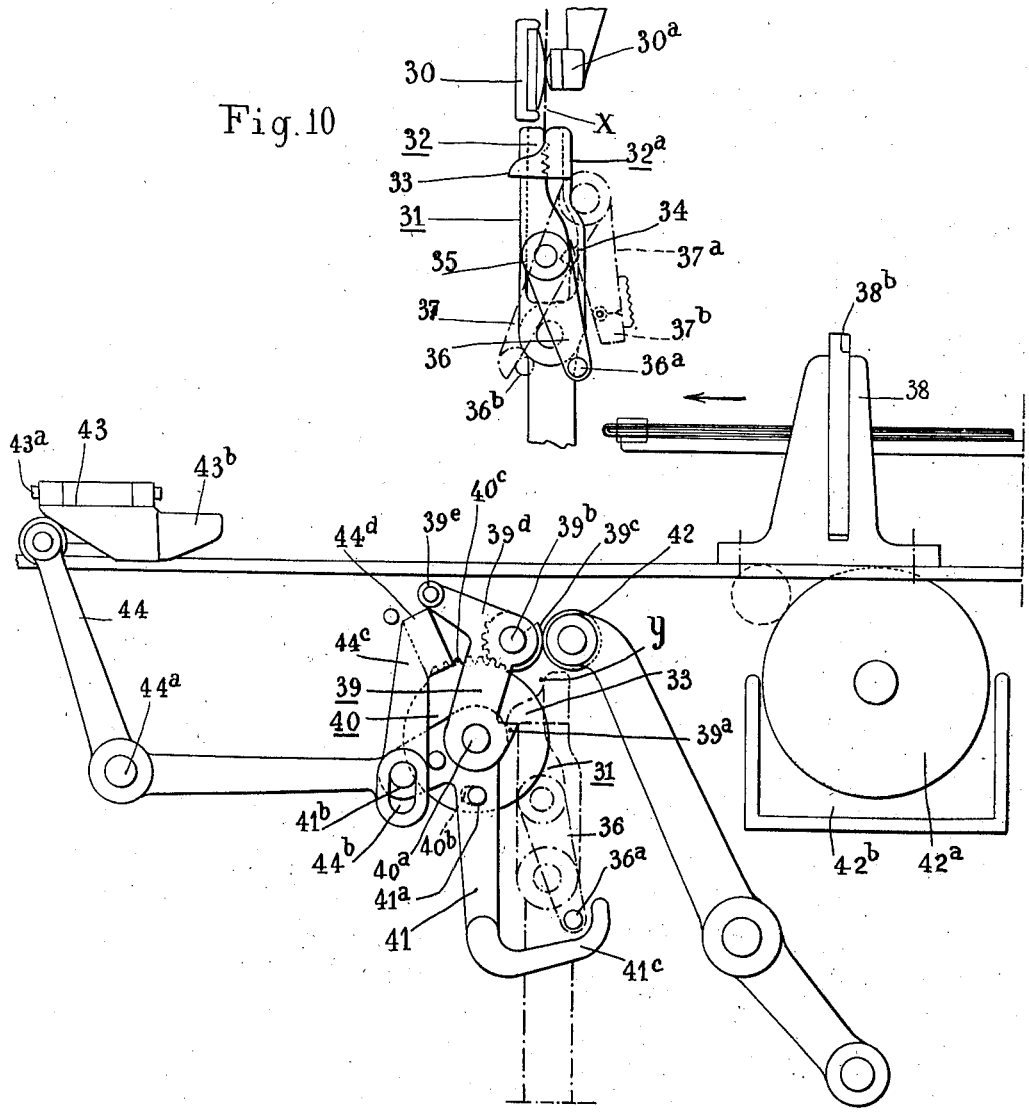

Fig. 12
Fig. 11
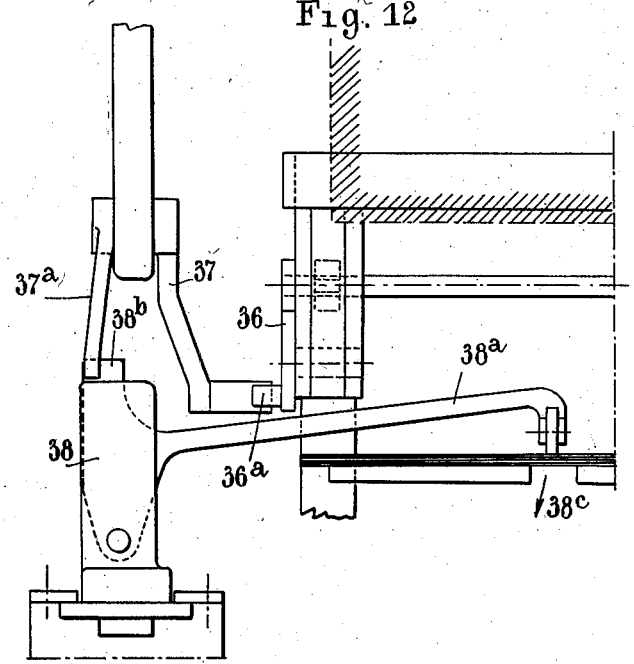
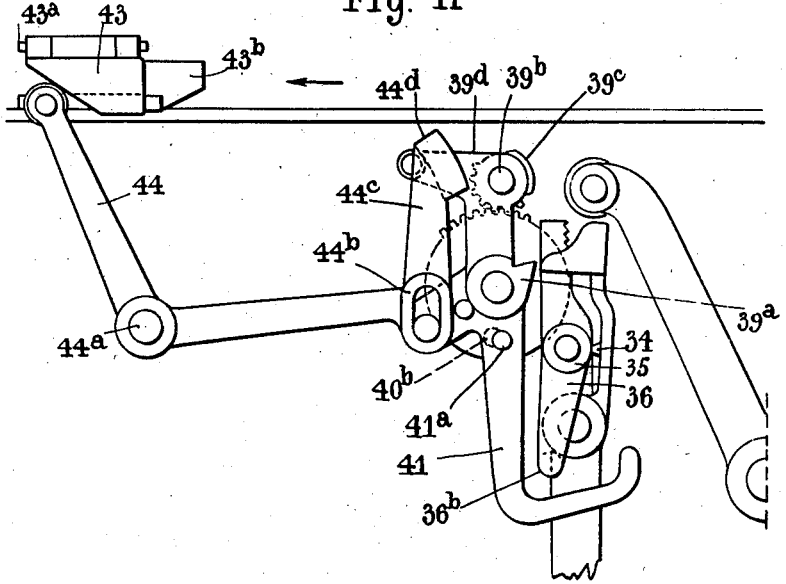

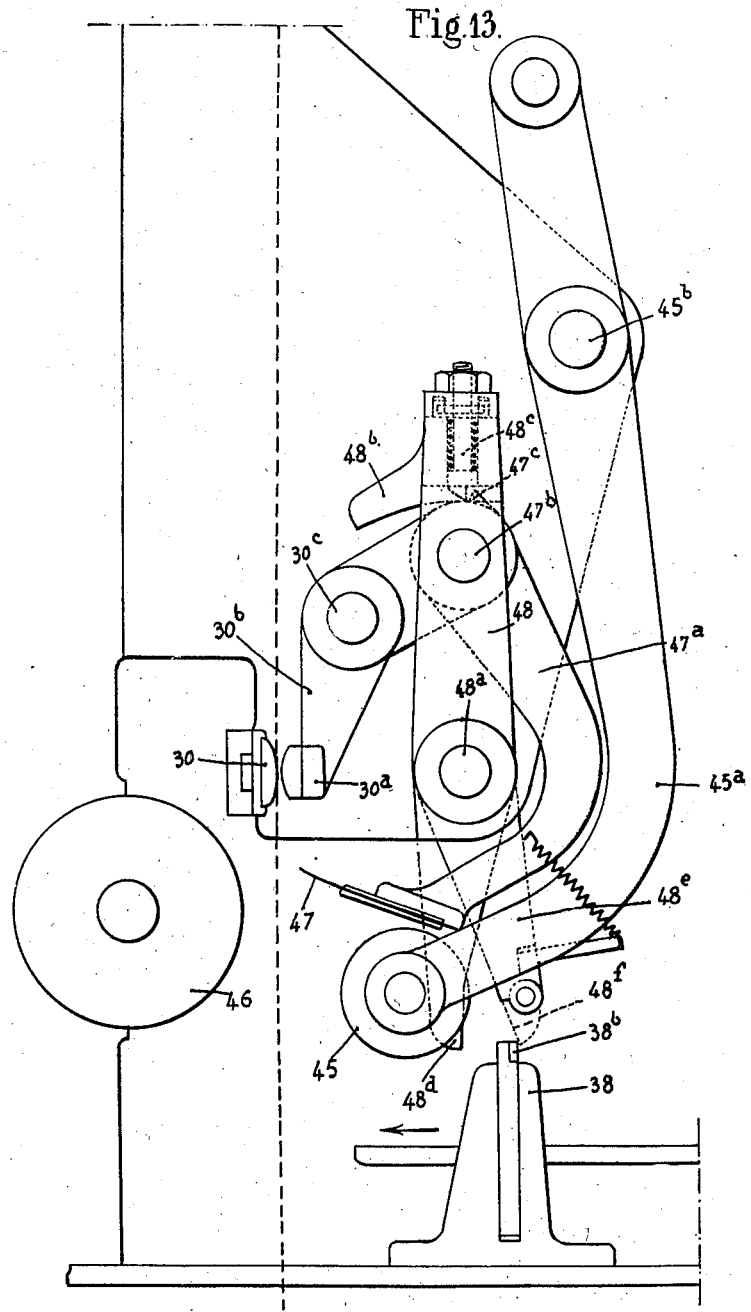

Sept. 14, 1926.

J. M. R. DUPLAY 1,599,993

PRINT WRAPPING MACHINE

Filed Sept. 8, 1924    17 Sheets-Sheet 9

Inventor
J. M. R. Duplay
by Langner, Parry, Card & Langner
Attys.

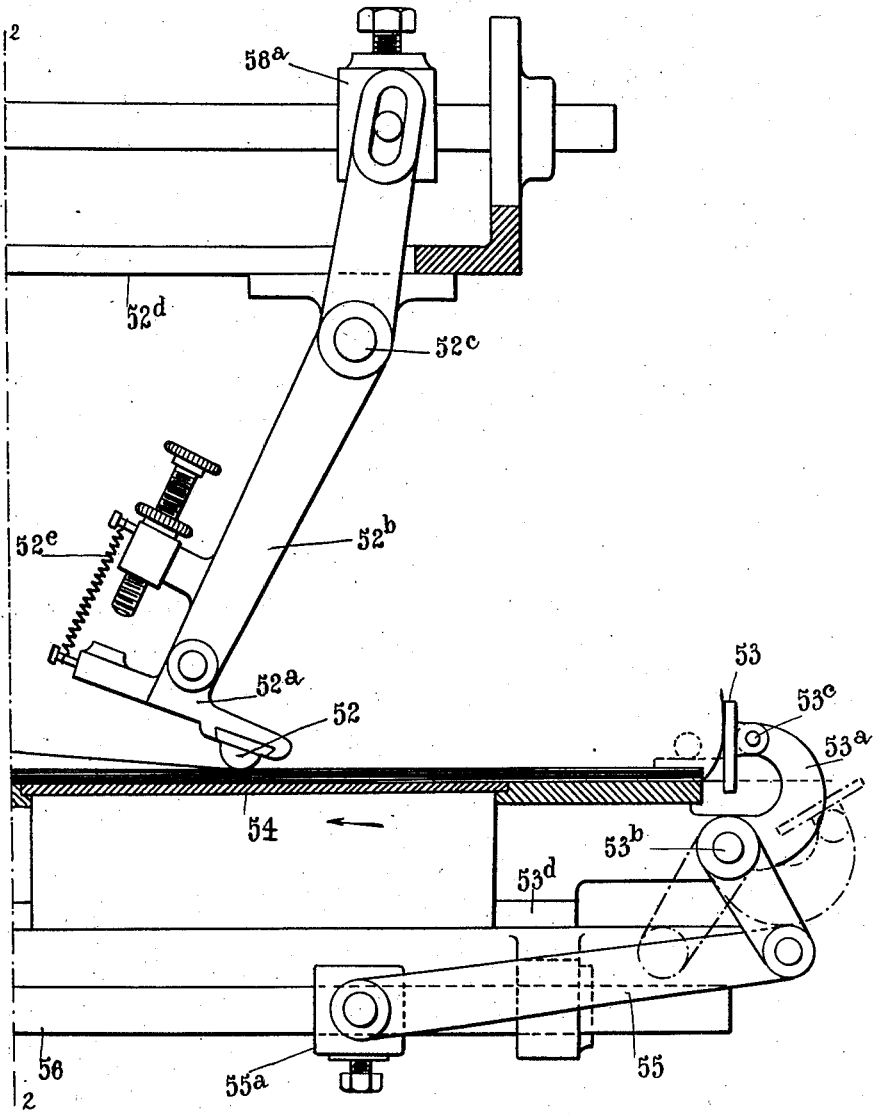

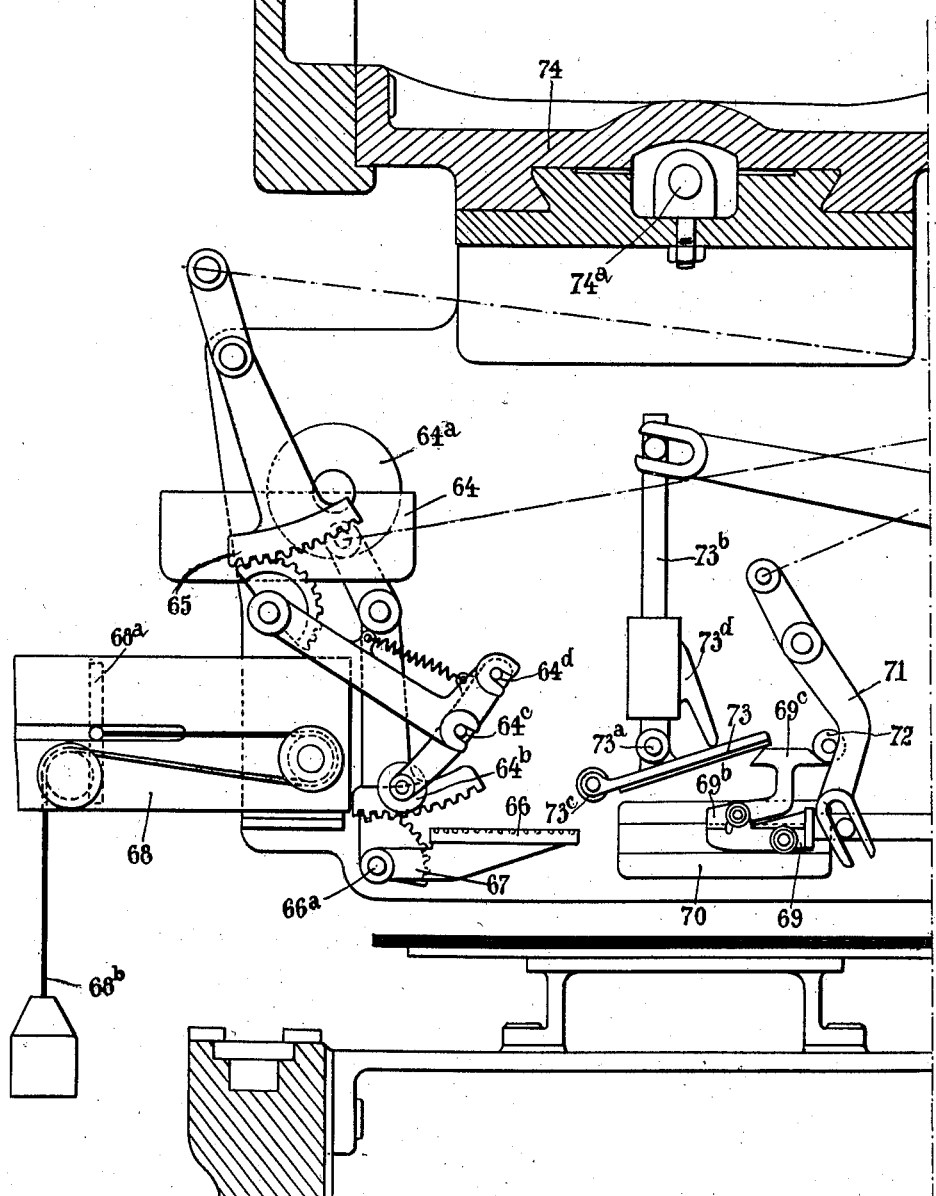

Sept. 14, 1926.
J. M. R. DUPLAY
1,599,993
PRINT WRAPPING MACHINE
Filed Sept. 8, 1924
17 Sheets-Sheet 13
Fig. 17.<sup>a</sup>
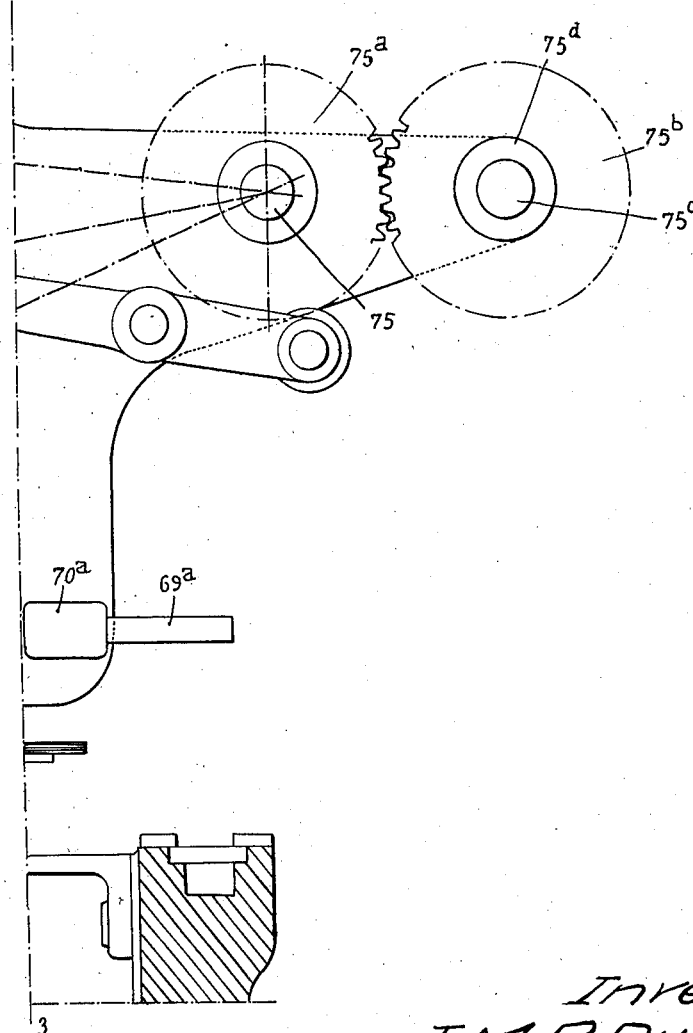

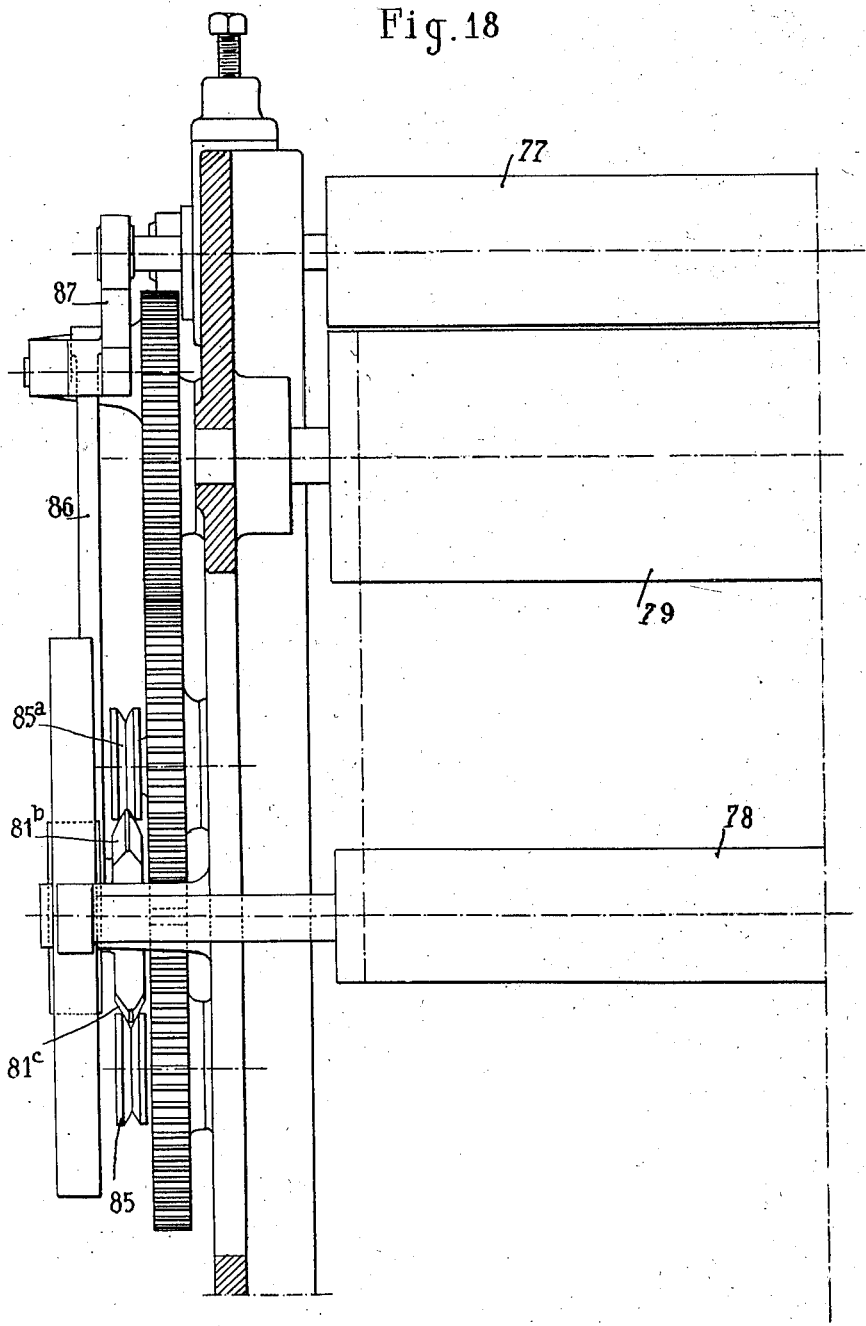

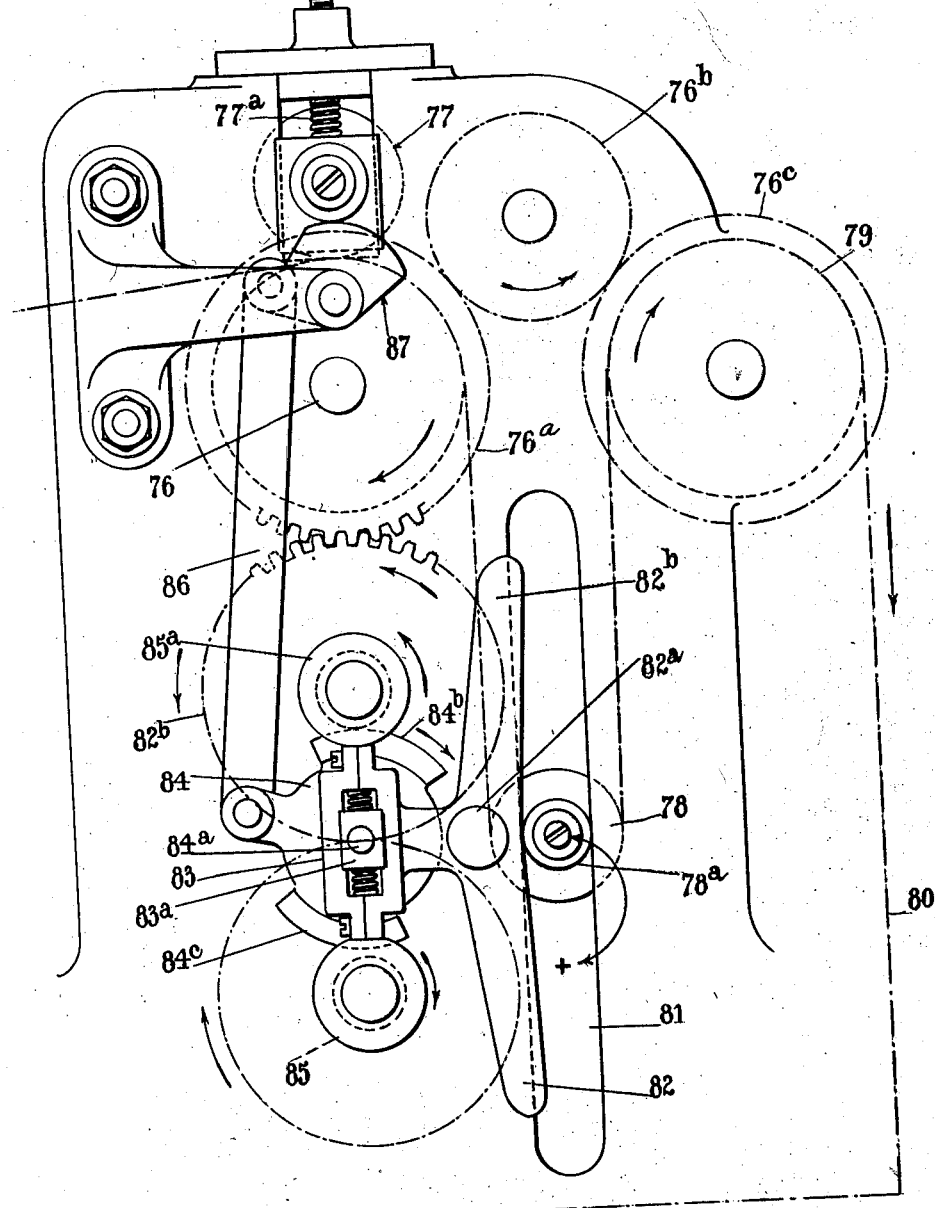

Sept. 14, 1926.  1,599,993
J. M. R. DUPLAY
PRINT WRAPPING MACHINE
Filed Sept. 8, 1924   17 Sheets-Sheet 16

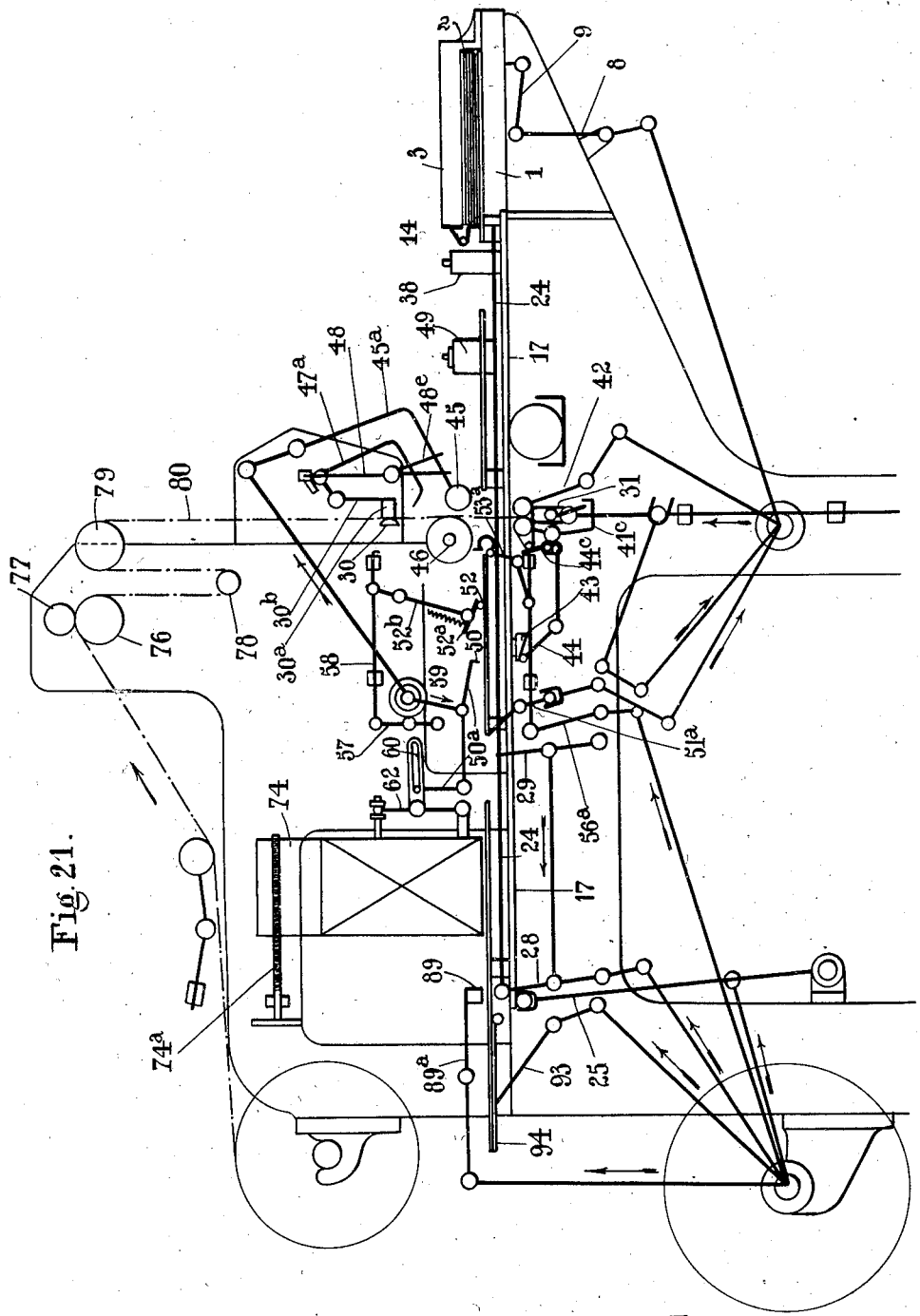

Patented Sept. 14, 1926.

1,599,993

UNITED STATES PATENT OFFICE.

JEAN MARCEL REGESTER DUPLAY, OF PARIS, FRANCE.

PRINT-WRAPPING MACHINE.

Application filed September 8, 1924, Serial No. 736,623, and in France September 19, 1923.

The present invention has for its object a machine intended for wrapping magazines, catalogues or other prints with a wide band, closed and labelled.

The annexed drawings represent, by way of example, a machine of this kind for wrapping catalogues or prints of all sizes, in a single passage, with a wide band constituted by a folded sheet of paper which is set to margins in such a way that the printed matter projects equally on both sides of its width, and of which the two ends are united by sticking, the band also receiving a margin-set and gummed label on which are affixed the necessary stamps and punch-marks.

The machine is supplied with the paper which is to constitute the bands in the form of rolls and the labels ready cut in packets.

The prints stacked in piles at the entrance to the machine, enter one by one, the back first, and travel therein by a series of equal stages, separated by equal pauses, being finally ejected therefrom at the other end, in closed wrappers, labelled and stamped.

The machine effects the work above defined, by successive phases, during the respective stages of the displacement of the prints and the following pause.

Each phase brings into operation a given group of parts of the machine.

Each of these groups of parts is maintained automatically out of action, if, for any reason, no print has been brought to the group of parts corresponding to the preceding phase.

The phases of the work succeed one another in the following order:

1. Margin-setting of the prints, which are brought one by one within reach of the transfer devices.

2. First stage of the displacement, during which there operates a control device, actuated by the print itself and which cuts out the group of parts operating at the following phase if a print has not actually undergone the first stage of the work.—First station.

3(a). Second stage of the displacement. Preliminary unwinding of a fixed length of the paper from the band, which remains in readiness and is gummed near its free end.

3(b). End of the unwinding of the paper from the band to form a loop, end of the gumming, cutting of the band.—Second station.—Curving of the catalogue, tension of the wrapper, turning down of the gummed end of the band, sticking, automatic control exerted in principle as at the preceding phase and for the same purpose.

4. Third stage. Third station: labelling.

5(a). Displacement, margin-setting of the back of the catalogue, affixing of the punch-mark and stamp upon the label. Control.

5(b). Ejection.

The drawings accompanying this specification represent respectively:

Figure 1, an elevation of the margin-setting and introducing device.

Figure 2:
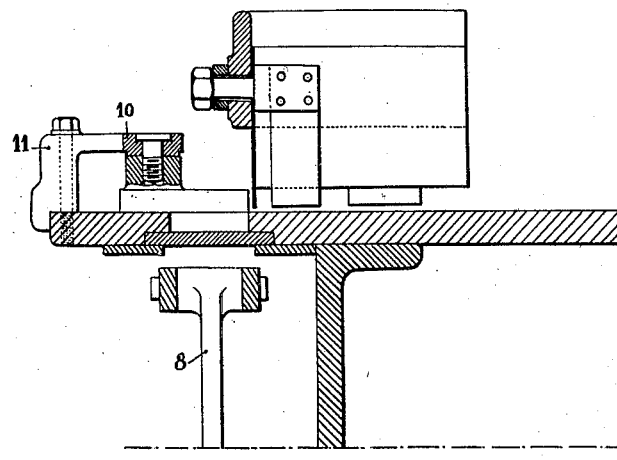

Figure 2, a section along the line 2—2 of Figure 1 (left part).

Figure 3:
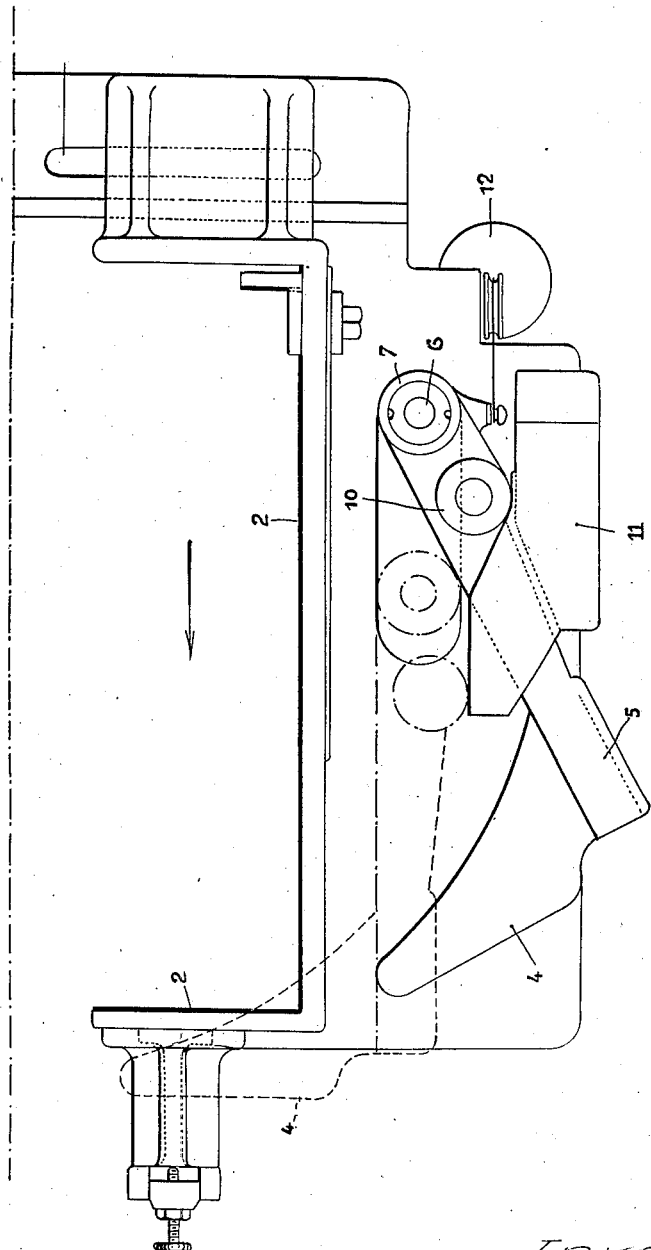

Figure 3, a half plan.

Figure 4:
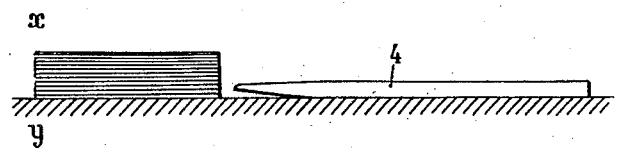

Figure 4, a diagram of the introducing device.

Figures 5 and 5ª are elevations of the transporting device.

Figures 6 and 6ª are corresponding views in plan.

Figure 7, a front view of the transporting grippers.

Figure 8, a section along the line 8—8 of Figure 7.

Figure 9, a view in plan, on a larger scale, of the device for opening and closing the grippers.

Figure 10, a general view of the grippers which seize the paper for the preliminary unwinding and of the device for gumming the paper; the control exercised in the preceding phase is assumed to have allowed the entry into action of the grippers.

Figure 11 shows the position of the gumming devices in the case where the control has not allowed by grippers to seize the paper.

Figure 12, a partial transverse section, showing the manner of exercising the control of the seizure of the paper by the catalogue itself before wrapping.

Figure 13, a general view of the devices for complementary supply of paper and for cutting, this last being out of action.

Figure 14:
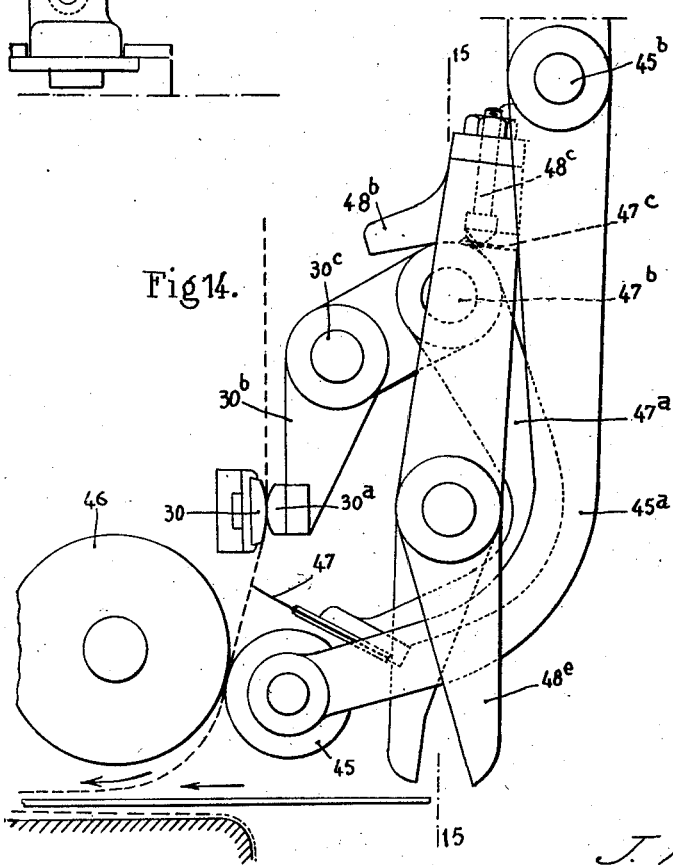

Figure 14, a view of the cutting device in action.

Figure 15:
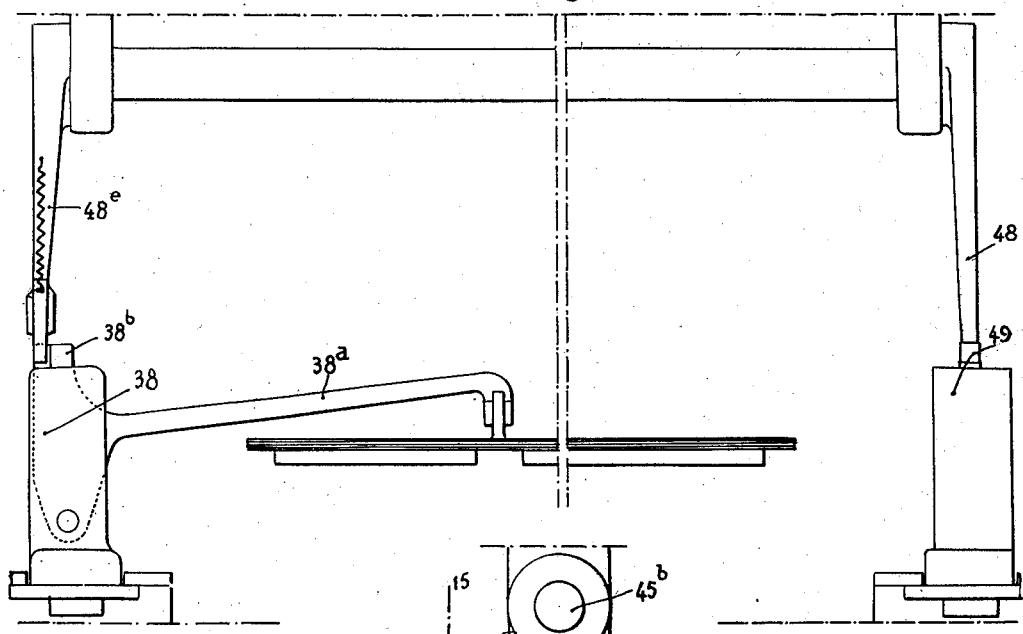

Figure 15, a cross section of the machine along the line 15—15 of Figure 14, showing the manner of exercising the preliminary control of the parts for unwinding and for cutting the paper.

Figure 16:
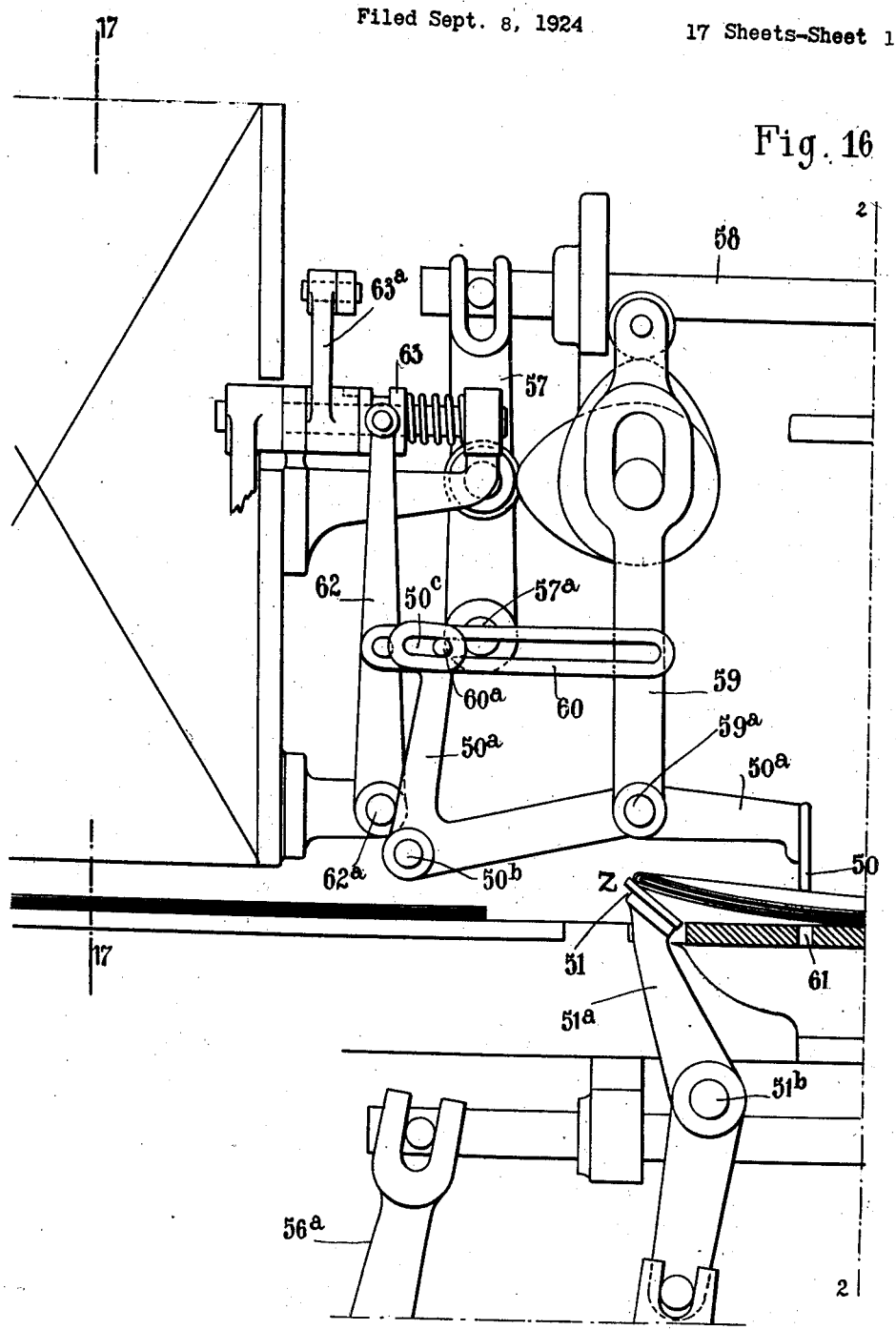

Figures 16 and 16ª are general views showing the group of parts which effects the closing of the band and the manner of exercising the control upon the operation of the labelling.

Figures 17 and 17ª are cross sections on the line 17—17 of Figure 16, showing the labelling devices.

Figure 18, an elevation of the device regulating the disposal of the paper.

Figure 19, a corresponding side view, showing the gears.

Figure 20:
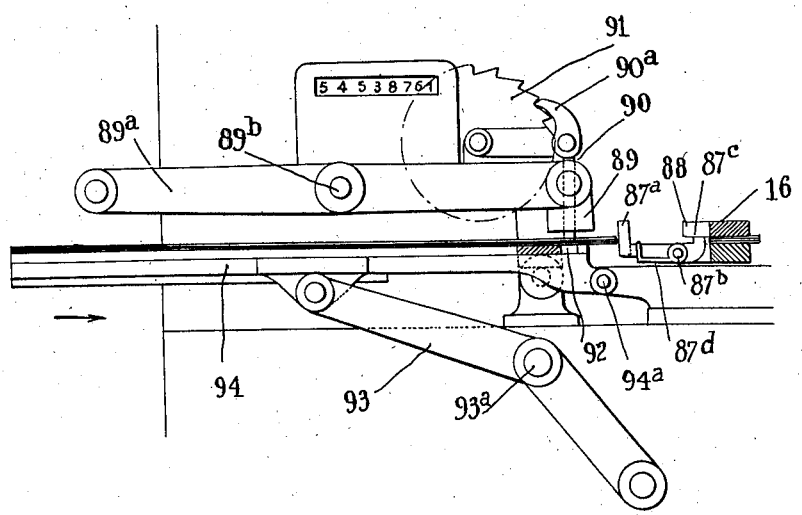

Figure 20, a view in transverse section of the punching and counting station and of the ejecting device.

Figure 21, a diagrammatic general view of the machine showing the general arrangement of the driving means.

The catalogues are arranged in a pile, the back towards the machine, upon the horizontal bed plate 1 (Figure 1) in a margin-setting apparatus constituted by vertical pieces of sheet iron 2 which can be displaced, while remaining respectively parallel to the longitudinal axis and to the transverse axis of the bed-plate, due to the slides 3. Prints of any size can thus be set to margin.

The device which introduces the catalogues one by one into the machine comprises two blades 4 of which the thinned ends assume the appearance represented in Figure 4, these blades being arranged symmetrically on both sides of the axis of the machine.

These blades are fixed to the end of arms 5 each pivoted on a vertical axis 6 which is carried by a slide 7 given a horizontal reciprocating motion by the lever 8 and the link 9. This link is itself operated as shown diagrammatically in Figure 21. The arm 5 carries a roller 10 held constantly against the guiding template 11, fixed to the frame, by the action of a counterweight 12, suspended by a cable.

When the lever 8 moves in the direction of the machine, it carries with it this spindle 6 and therefore the blade 4; in this movement, the roller 10 following the curve of the template 11 rocks the arm 5 upon its axis and compels the blade 4 to enter its point between the sheets of the lower print (see Figure 4 where $x-y$ represents the thickness of a print). When the roller arrives at the end of the slope of the template, the introducing blades are brought to their working position, that is to say with their edges perpendicular to the longitudinal axis of the machine; this edge is at the same time very near the back of the catalogue, which will be ejected from the margin-setter and introduced into the machine during the next displacement of the member 4. This displacement takes place parallel to the axis of the machine, the roller then travelling upon the flat of the template.

The final position of the introducing members is represented in dot and dash lines in Figure 3.

An adjustable gate prevents several catalogues from leaving the margin-setter at the same time. This gate comprises a fixed support 13 and a lever 14 pivoted at 15. A spring tends to press the end of the lever upon the bedplate 1 of the margin-setter, an adjusting screw limiting its downward stroke.

The use of a margin-setter of different type can allow of utilizing the machine for wrapping prints comprising only a single leaflet.

The catalogues ejected from the margin-setter are then led to the different stations by a double row of grippers 16 which face one another in pairs.

The machine comprises four pairs of these grippers fixed upon the sliding bars 17. When the bars 17 move in the direction opposite to that of the machine, the grippers are opened and each pair of grippers at the end of its stroke comes level with the back of a catalogue; at this moment the grippers close and the bars take a backward movement transporting the catalogues to the following station where the grippers release them as they open. Thus each catalogue is withdrawn from the position I and brought to the position I$^{bis}$, and will pass successively to each of the stations II, III and IV, being pushed forward at the last station by a heel carried by the last gripper of each row in the manner described hereafter (see Figure 20).

Each of the transporting grippers comprises a support 18 fixed upon one of the bars 17, which travel in slides arranged symmetrically on both sides of the axis of the machine. Upon this support 18 is fixed a gallows 19 upon which the gripper proper is slidable so that it can be secured at the position determined by the size of the catalogue; the gripper consists of the fixed jaw 20 and the movable jaw 21 operated by a cam 22 carried by the fixed jaw (Figures 7 and 8). This cam acts upon the roller 23 of which Figure 9 shows the two positions diagrammatically in plan. All the cams situated on the same side of the machine are connected together by an operating rod 24.

Figure 5 represents diagrammatically the devices for operating the bars which carry the grippers and the rod which effects the opening and the closing of the grippers. Two levers 25 situated at right and at left of the frame are driven by cam and connecting rod (Figure 21) so as to oscillate from A to B. Each of these levers presents at its free extremity a fork which embraces a pin 26 fixed upon one of the bars 17, in such a way that it communicates to this bar rectilinear reciprocating movements which cause each pair of grippers to pass from one station to the next station and vice versa.

In these movements, the grippers carry with them their cams and the rod operating the latter; this rod terminates towards the front in a projection 27 lying perpendicular to the plane of the drawing and passing to 27ª when the pin 26 comes into the position 26ª. At this moment, and before the lever 25 leaves the position B, a small lever 28 operated by a cam, acts upon the projection 27 (which is at 27ª, Figure 5), in the direction opposite to that of the machine so as to move the cam 22 from the position shown in Figure 9 in dot and dash lines (gripper closed) to the position shown in full lines (gripper open). The catalogues, taken up at the several stations, have then all been carried to and deposited at the next stations.

The open and empty grippers return to their respective positions of departure while the second lever 29 which is linked to 28 and had oscillated with it in the direction of the machine, returns to its original position, pulling upon the gripper-operating rod 24 so as to close the grippers upon a fresh catalogue.

The stations I, I$^{bis}$ and II are waiting stations during which the catalogues undergo no treatment. The wrapper paper will be supplied, in two periods, between the stations II and III, at the last of which the wrapping is effected.

The wrapper paper is supplied to the machine in the form of rolls, the unwinding of which is regulated by the following means. The paper is first pinched against a rubber-covered transverse bar 30 of which the length corresponds to the greatest width of paper to be employed and a co-operating bar 30ª. Before the paper is released by 30ª, a gripper 31, of which the jaws have likewise a width which corresponds to that of the widest paper to be employed, seizes it at its free edge at X in order to draw it down vertically from X to Y, the lower position being constant. In this way there is produced the preliminary unwinding of a length of paper compatible with that which is necessary for wrapping the prints of the smallest size current. The ascent and descent of the gripper 31 take place during the return empty of the transporting grippers. The gripper 31 is composed of a fixed jaw 32 carried by a rigid frame (not shown) which slides vertically in guides on the frame of the machine. Upon 32 there is pivoted the movable jaw 32ª which carries a beak 33 and lugs 34 which engage in corresponding recesses in discs 35. (Figure 11) when the gripper 31 is closed. These discs are all fast upon the same spindle upon which is fixed an operating lever 36 carrying a finger 36ª (Figure 12). When the open gripper rises to seize the paper, the finger 36ª lies at 36$^b$ (Figures 10 and 11) and encounters the end of the lever 37 when the gripper arrives at the topmost point in its stroke. This lever is hinged to the frame (Figure 12), and is operated by the lever 37ª maintained in the position of the drawing by a spring (not shown), the lever 37ª being terminated by a pawl 37$^b$. When a catalogue has just been brought to the station III, the part 38 carrying the feeler 38ª and fixed upon a gripper-carrying bar has been displaced beyond the line X—Y. Before the part 38 returns to the near side of the axis X—Y, the gripper 31 has arrived open at the top of its stroke. If there is a catalogue at the station II, the finger 38ª (Figure 12) is lifted and the stop 38$^b$ being turned back will encounter during the return movement of the transporting bars, the pawl 37$^b$ which in this direction carries along the lever 37ª and therefore the lever 37.

The latter operates in the contrary direction to that of the machine, the lever 36, and restores its finger to the position 36ª; the discs 35 then present their recesses in front of the lugs and the movable jaw closes again, under the action of a spring (not shown). If there is no catalogue to take up at the station II, the finger 38ª falls into a groove 38$^c$ of the table where the catalogues travel, the stop 38$^b$ moves aside and no longer acts upon the lever 37ª, and the gripper 31 remains open; it will therefore not transport any paper, which indeed would be useless, since in the following period there will be no catalogue to wrap.

If, on the contrary, there is a catalogue at the station II and consequently the paper is gripped at X, the bar 30ª releases it, the gripper 31 descends vertically as far as the position Y. (It will be seen later that the bar 30ª holds the paper, if the gripper 31 has not been closed.) As soon as the gripper 31 has passed over the plane of travel of the catalogues, the latter are forwarded, each towards the next station; a catalogue then passing from II to III will travel in a direction perpendicular to that of the wrapper paper, and at the moment when the catalogue is about to arrive in contact with the paper stretched along the line X—Y, the supply of the complementary quantity of paper is produced by the following device.

When the gripper 31 arrives at the bottom of its stroke, its beak 33 acts upon the beak 39ª of one of the two levers 39 mounted upon a spindle 39$^b$. These two levers 39 carry a roller of which only a segment 39$^c$ projects and upon which is fixed a toothed sector 39$^d$ meshing with a pinion 40; the latter is loose upon the spindle 40ª and is connected by a lug 41ª and a slot 40$^b$ to the lever 41, which comprises a finger 41$^b$ and a hook 41$^c$. The beak 33, in acting upon 39ª downwards, brings the circumference of the segment 39ᶜ into contact with the paper and holds it in this position, while a gumming roller 42, which has taken up its gum from 42ª revolving in a gum-bath 42ᵇ, comes to bear upon the paper which it presses against the segment 39ᶜ. During this period, the complementary supply of paper takes place; when it is finished, the paper is cut. The catalogue and paper must travel together for an instant longer, and not only must the gripper 31 release its hold, but the gumming roller must also be detached from the paper. In order to attain this object, during the end of the stroke of the gripper-carrying bars, a pattern block 43 fixed upon one of them, acts upon a lever 44 pivoted at 44ª of which the horizontal arm carries a slot 44ᵇ and an extension 44ᶜ terminated by a stop 44ᵈ. In the first part of the movement the stop 44ᵈ places itself behind the finger 39ᵉ carried by the tail of one of the levers 39; the latter are thus maintained in position and cannot obey the action of the spring (not shown) which urges them in the direction of the machine when the beak 33 leaves the beak 39ª, as the gripper 31 opens. The lever 44 continuing its stroke, the slot 44ᵇ then carries along by the finger 41ᵇ the lever 41 and the hook 41ᶜ which opens the gripper 31; then immediately after, the lug 41ª by the slot 40ᵇ, drives the gear wheel 40 in its turn which by acting upon the segment 40ᶜ determines the partial rotation of the cylinder which carries the segment 39ᶜ. In this movement, the line of gum laid upon the paper by the roller 42 is spread out, while reserving however towards the edge of the paper a small ungummed margin, so as to obviate exudations when the sticking takes place.

With a view to this result, the development of the segment 39ᶜ is slightly less than the length of paper comprised between the point of contact of the roller and the gripped end of the paper. If the gripper 31 had not taken any paper, the segment 39ᶜ would have remained at a distance towards the left (Figure 11), the gumming roller would have operated idly, the stop 44ᵈ would have passed behind the finger 39ᵉ and all the parts moved by the pattern-block 43 would operate idly to resume under the action of their opposing spring (not shown) their normal waiting position for the next cycle.

When the paper has been gummed and relinquished by the rollers, the gumming roller has been returned to its gum-taking position; it is seen in Figure 11 that the open gripper 31 will be able to rise again without encountering the segment 39ᶜ, since the vertical gripper rises again only during the return of the horizontal grippers empty. Now during this movement, the pattern-block 43 frees all the parts which it has operated, and the latter, in particular the sector 39ᶜ, will return to their waiting position (Figure 11).

Since catalogues of small or large size have always their backs set to a margin on the same line, corresponding to the end of the constant stroke of the horizontal grippers, it will be necessary to release the paper from the gumming rollers and to open the gripper 31 at different moments of the stroke of these horizontal grippers, according to the size of the catalogues. For this purpose, the position of the pattern-block 43 is made adjustable upon the gripper-carrying bar which operates it. For prints of the largest sizes, it will act only at the end of the stroke, but for the smallest, it will enter into action at the start of the displacement and will pass over the lever 44. In order that it may exercise no action upon these levers on the return, the pattern-block 43 is hinged to its support on a horizontal axis 43ª in such a manner as to be able to move out of the way towards the frame; it terminates in an inclined plane 43ᵇ, tapering in relation to the plane of the drawing; it follows that the pattern-block 43 having passed beyond the lever 44 will find the latter, on its return, in front of the inclined plane 43ᵇ and that the pattern-block will slide against the lever 44 and will move out of the way by rocking about its axis 43ª.

The paper having been supplied partially by the gripper 31, the catalogue to be wrapped passed from the station II to the station III. Before the back of this catalogue touches the paper, a roller 45 carried by an arm 45ª, hinged to the frame at 45ᵇ, is placed in contact by the action of a cam with the roller 46 rotating uniformly with a circumferential speed dependent on the speed of displacement of the catalogues. The vertical gripper 31 being arrested in its lower position, the gummed end of the paper will remain stationary (Figure 14), the paper supplied by the rollers 45 and 46 forming a loop in front of the catalogue.

When the complementary supply of paper is complete, the paper is immediately gripped between the two before-mentioned transverse bars 30 and 30ª (Figure 10), the one stationary, the other movable, and is cut by a saw-toothed blade 47. These two operations bring into action a device which comprises on each side of the frame, a lever 30ᵇ, hinged at 30ᶜ and carrying suspended at its free end two arms 47ª; these arms are keyed upon the same spindle 47ᵇ and carry the saw-toothed blade 47, one of the arms being provided with a lug 47ᶜ. On the other hand, upon the frame, there pivots at 48ª a lever 48, terminated at the top by an eccentrically curved head 48ᵇ which carries a spring point 48ᶜ. At its lower end, the lever 48 is terminated by a beak 48ᵈ upon which there acts a stop which can be regulated in position upon the gripper-carrying bar (49 on the right of Figure 15) according to the length of the catalogue. When the supplementary supply of paper is terminated, the stop 49 rocks the lever 48 which by its curve $48^d$ acts downwardly upon the lever $30^b$ in order to lock against the bar 30 the movable bar $30^a$.

The latter holds the paper stationary while the point $48^c$ acting upon the lug $47^c$ briskly impels against the paper stretched along X—Y the saw-toothed blade carried by the lever $47^a$. In its movement, the point $48^c$ passes over the lug $47^c$ in such a way that the blade can immediately resume its waiting position under the action of a spring (not shown) acting upon one of the arms $47^a$.

After the cutting and immobilization of the paper, the catalogue pursues its course and the lever 48 remains in the position which has been given to it by the stop 49, which finally allows the beak $48^d$ to escape. During this oscillation of the lever 48, an arm $48^e$ mounted on the same spindle is brought to its lower position, so that at the return of the grippers empty (Figure 15) the stop 38 (which also serves to close the vertical gripper 31) acts upon the arm $48^d$ in order to return the head of the lever 48 to its vertical position, thereby releasing the paper. It is seen, in Figure 15, that if there is no catalogue at the station II, the feeler finger $38^a$ of the stop 38 will drop, displacing the stop $38^b$ which therefore no longer acts upon the beak $48^f$ of the lever $48^e$, so that the paper will then remain gripped during a new cycle. It has been seen previously that in the same conditions the vertical gripper had not closed. If in the following cycle, a catalogue is brought to the station II, the beak $38^b$ of the stop 38 will be raised, when it will pass over the end of the lever $48^e$. This lever carries at its end a pawl $48^f$ which allows the actuation of $48^e$ only in the direction opposite to that of the machine.

The paper wrapper, cut off and detached from the gumming rollers, is carried along with the catalogue in such a way that, whatever be the length of the latter, its back comes to the line Z (Figure 16). At this moment a blade 50 presses upon the catalogue and curves it in slightly while a plate 51 carried by the levers $51^a$ keyed upon a spindle $51^b$ raises the back of the catalogue and compels it to bend, as shown in Figure 16. At the same instant, a rubber fillet 52 carried by a rocking member $52^a$ hinged on both sides upon the levers $52^b$ exerts a pull upon the paper wrapper, which then stretches itself along the chord of the arc formed by the catalogue. As soon as this pull is effected, a plate 53 hinged upon the levers $53^a$ fast to the spindle $53^b$, lifts the gummed flap, and then coming into abutment against the edge of the catalogue, rocks around its spindle $53^c$ and turns over, carrying with it the flap of the wrapper which it presses firmly in place to ensure the sticking. In Figure $16^a$, the dot and dash lines represent the waiting position, and the dotted lines the extreme position of the plate at the end of the sticking.

Since the point where the turning down of the gummed flap takes place is variable, means must be provided whereby the support $53^d$ of the levers $53^a$ can be displaced at will along the frame. A plate 54 of adjustable length, forms the support table for the catalogue. The movements of the turning down plate are produced by a link 55 hinged at its foot upon a cursor $55^a$ which can be fixed at any point upon the operating bar 56, according to the position which the plate 53 is to occupy. The operating bar 56 is given rectilinear reciprocating movements by a lever $56^a$ actuated by cam and connecting rod. The rubber fillet 52 is likewise displaceable according to the size of the catalogue; for this purpose the levers $52^b$ are fast to the same spindle $52^c$ revolving in bearings which can slide upon the supports $52^d$ carried by the frame. The fillet 52 is operated by a cam which actuates a lever 57 hinged at $57^a$; this lever 57 actuates in its turn the bar 58 upon which the cursor $58^a$ hinged to the lever $52^b$ is displaceable at will. The waiting position of the rubber-covered fillet 52 is adjustable by operation of the screw stop $52^e$ against which the free end of the lever $52^a$ abuts.

When the catalogue is wrapped, it passes to the labelling station IV, but since this operation must only take place if a catalogue actually arrives at the station IV, the blade 50 (Figure 16) is provided to perform the part of feeler at the station III. This blade is fixed upon the levers $50^a$ keyed upon a spindle $50^b$ pivoted on the frame; a link 59 operated by cam and recalled by spring is hinged at $59^a$ upon one of the levers $50^a$ and imparts to them a movement of oscillation. If there is a catalogue at III, the blade 50 is arrested towards the bottom of its stroke, and the slot $50^c$ in the arm $50^a$ does not act upon the finger $60^a$ integral with the slide 60. If on the contrary there is no catalogue, the blade 50 continues its course and penetrates into the groove 61. By means of the finger $60^a$ the slot $50^c$ drives the slide 60 fixed upon the lever 62 and rocks the latter in the opposite direction to that of the machine, around the axis $62^a$. In this rocking movement, the upper end of the lever 62 acts upon a collar 63 which couples or uncouples the labelling devices according as there is or is not a catalogue at the station III. The position of the labelling axis will have to vary according to the size of the catalogue in the machine, in order that the label may be in proper marginal relation to the back of the catalogue.

With a view to this result, the labelling devices are combined in a single unit, displaceable at will along the longitudinal axis of the machine. The slide 60 establishes connection between the levers 50ª hinged upon a spindle 50ᵇ fixed to the frame and the lever 62 hinged on the labelling unit. It will therefore permit the displacements of this unit, since the finger 60ª can slide at will along the guide 60 and be fixed at any point in this guide.

The labelling devices (Figure 17) comprise a gum-bath 64, a feed roller 64ª, a taking or messenger roller 64ᵇ operated by the sector 65 and serving to coat a plate 66 operated by the toothed sector 67. When the plate 66 rises again, rocking around the axis 66ª, the gumming roller likewise rises, and these two movements are co-ordinated in such a way that the messenger 64ᵇ may act without excessive pressure upon 66. The lever which carries the roller 64ᵇ presents a double joint 64ᶜ and 64ᵈ which allows it to oscillate around 64ᵇ while in contact with the roller 64ª and to oscillate around 64ᶜ while in contact with the plate 66. The plate 66, when gummed, rises until its plane, horizontal in the waiting position, becomes vertical and enters the horizontal compartment 68 which contains the labels stacked upon edge and constantly pushed forward, for example, by a plate 68ª drawn by a cable to which is attached a weight 68ᵇ. The labels are held at the exit from 68 by four small knives pressing their points upon them. When the plate 66 comes into contact with the label occupying the top of the pile, it gums it and carries it away; the knives allow it to pass making slight cuts therein. The plate 66 then brings it to the horizontal position where it is seized by the gripper 69. During the further recoil of this gripper, the plate 66 rocks downwardly in order to allow the detachment of the label and its transport by the gripper 69; the plate 66 then returns to its horizontal waiting position. It is at this moment that the feeler 50 acts (Figure 16). If there is a catalogue at the wrapping station, the arm 63ª, loose upon its spindle, is coupled to this spindle by the collar 63; the arm which drives the sector 67 (Figure 17) is then operated and the plate 66 takes up a label, during the period of wrapping of the catalogue on which this label will be affixed at the following cycle.

The gripper 69 comprises a stationary jaw, guided in the slide 70 and extended by a rod 69ª guided at 70ª, and a movable jaw, the gripper being kept closed by a spring (not shown). An operating lever 71 imparts to this jaw a rectilinear reciprocating movement. The movable jaw 69ᵇ has a tail 69ᶜ which in the waiting position abuts upon a roller 72, being thereby forced down to produce the opening of the gripper. The plate 73, pivoted under the action of a spring on the axis 73ª carried by the rod 73ᵇ, then drops; the roller 73ᶜ adjusts the edge of the label upon the catalogue, at the moment when the label is released by the gripper 69, then continuing its course the plate 73 exerts its pressure upon the whole surface of the label and ensures its attachment. The plate, operated by the rod 73ᵇ, then rises again and comes to abut upon a stationary finger 73ᵈ which arrests it in a position approaching the horizontal, the roller 73ᶜ being maintained at a sufficient height to allow free passage to the gripper 69. When the jaws of this gripper arrive at the end of their stroke, within reach of the label laid upon the plate 66, the tail 69ᶜ abuts against a roller carried by the spindle 73ª, which produces the opening of the gripper. The rod 73ᵇ then rises causing the closing of the gripper which returns to its starting position carrying the label with it.

The whole of the labelling parts constituting as has been stated above a unit can be caused to slide longitudinally beneath a horizontal arm 74 on the frame, by means of a screw device 74ª operated by a hand wheel in a manner analogous to a machine-tool slide-rest.

The labelling members are operated by cams mounted upon a shaft 75. This shaft receives by means of the gear wheels, 75ª, 75ᵇ, a movement of continuous rotation which is communicated to it by the shaft 75ᶜ revolving in bearings fixed to the frame. This shaft passes freely in corresponding bores in the sides of the labelling unit and has a key way of length sufficient to allow the necessary displacement of the unit. The wheel 75ᵇ carries a key adapted to slide in the groove on the shaft 75ᶜ; this wheel is held between two bosses such as 75ᵈ and therefore follows all the movements of the unit without ceasing to be in mesh with the wheel 75ª.

The machine may have to wrap catalogues of different sizes, the length of paper to be employed for each varying in a relation double that of the size of the catalogues. The machine must therefore be able to supply the wrapping station with the length of paper corresponding to the size of the catalogue in the machine. This result is attained by means of the device regulating the unwinding represented in Figures 18 and 19. The paper coming from the roll follows the path indicated in dot and dash lines (Figure 19). It passes, in the order, between the rollers 76 and 77, loops under the roller 78 and passes over the roller 79 in order to descend vertically to the taking members of the machine. The rollers 76 and 79 rotate at the same speed and in the same direction, due to the toothed wheels 76ª, 76ᵇ, 76ᶜ, and their development is such that during the time of one stage of movement of the catalogues, they deliver the length of paper necessary to wrap a catalogue of the largest size current. The roller 77 is kept in contact with 76 by adjustable springs 77ª. The feed devices, viz, the vertical gripper and the roller (Figures 10 and 13), draw upon the vertical length 80 which presses upon the roller 79 and the advance takes place with the necessary rapidity without risking the tearing of the paper. During the preliminary period of advance, the length of the paper utilized being always less than that unwound by 76 and 77, the roller 78 will descend little by little along the slot 81 in the frame in which its rollers 78ª are engaged. In this descending movement, it will encounter a flap 82 projecting along the groove 81. This flap forms part of a device oscillating around 82ª and comprising a second flap 82ᵇ symmetrical with 82. This device also comprises a frame 83 in which is mounted a bearing 83ª held elastically at its centre by springs. This bearing receives the spindle 84ª of the disc 84 of which the edges present a double bevel at 84ᵇ and 84ᶜ, this bevel corresponding to the throats of the pulleys 85 and 85ª, receiving from gear wheels a movement of rotation in the direction of the arrows on the drawing. When the rollers 76, 77 unwind a length of paper greater than the requirement, the roller 78 moves towards the bottom of the slot 81 and pushes back the flap 82 very easily because of the very slight slope which this flap presents; this movement rocks around 82ª the disc 84 of which the upper edge engages elastically in the throat of the pulley 85ª which then rotates the disc 84 around its axis 84ª. In this movement the disc carries upwards with it the link 86 actuating a cam 87 which comes to raise the roller 77. It follows that this roller slips and ceases to drive the paper. On the contrary, when the demand for paper increases again, the roller 78 rises acting upon the flap 82ᵇ in such a way as to bring the disc 84 in contact with the throat of the pulley 85 which will drive it in a direction such that it exerts a downward pull upon the link 86 and frees the roller 77 so that the unwinding of the paper recommences. The bringing into operation of this servo-motor device requires only a very slight force upon the flaps 82 and 82ᵇ. The roller 78 can be very light so as to permit a high speed of unwinding of the paper.

When the catalogues are labelled, they are pushed to the punching station (Figure 20) by a finger 87, carried by the last transporting grippers 16 (Figures 5 and 6). This finger rocks at 87ª upon the stationary jaw of the grippers 16 and its heel 87ᵇ is kept in low position by a lug 88 carried by the movable jaw of the gripper. When the gripper 16 takes up a catalogue at the wrapping station in order to bring it to the labelling station, the catalogue which has just been labelled is pushed to the following station by the finger 87. This device allows of margin-setting the catalogues along the edge opposite to the back; this edge is then located under the punch 89, whatever be the width of the catalogue. During the idle return of the grippers, the finger 87 moves aside under the action of the spring 87ᶜ and can pass beneath the catalogue which is at the labelling station. The punching is effected by a device fixed to the transverse bar 89 carried by two levers such as 89ª fast to the spindle 89ᵇ. Upon one of these levers can be mounted in addition a counter of which the feeler finger 90 rises to actuate the pawl 90ª and ratchet 91, only if a catalogue has been brought beneath the punch. In the contrary case, the finger 90 passes freely into the hole 92 in the punching table. When this operation has been accomplished, the lever 93, pivoted at 93ª, rocks downwards carrying with it the plate 94 which itself rocks around 94ª and allows the catalogue to slide off, wrapped, labelled and stamped.

Having thus described my invention what I claim is:—

1. A machine for wrapping prints in a closed band, comprising, gripping means arranged in two rows to feed the prints step by step, means for imparting a reciprocatory movement of translation to the gripping means, means for opening said gripping means at the end of each forward stroke and for closing said gripping means upon a print at the end of each backward stroke, means for delivering the wrapping paper, said delivering means comprising means adapted to deliver a fixed length of paper in a plane perpendicular to the plane of feed of the prints and in front of each print, and other means to deliver a further fixed length of paper, said lengths of paper being arranged to cooperate with the print, which has been fed by the gripping means, and to surround this print from below and from above, means for cutting the paper, means for coating one of the free ends of the paper with adhesive material, means for tensioning the band of paper around the print, means for bending one of the free ends of the paper over the other end and to produce the sticking of the paper at the part coated with adhesive material.

2. A machine for wrapping prints in a closed band, comprising, gripping means arranged in two rows to feed the prints step by step, means for imparting a reciprocatory movement of translation to the gripping means, means for opening said gripping means at the end of each forward stroke and for closing said gripping means upon a print at the end of each backward stroke, means for delivering the wrapping paper, said delivering means comprising means adapted to deliver a fixed length of paper in a plane perpendicular to the plane of feed of the prints in front of each print, and other means adapted to deliver a further fixed length of paper, said lengths of paper being arranged to cooperate with the print, which has been fed by the gripping means, and to surround this print from below and from above, means for cutting the paper, means for coating one of the free ends of the paper with adhesive material, means for tensioning the band of paper around the print, said tensioning means comprising means for curving close one end the print covered with the band of paper, and friction means for pulling the band towards the other end, means for bending one of the free ends of the paper over the other end and to produce the sticking of the paper at the part coated with adhesive material.

3. In a machine as claimed in claim 1, a rotary roller upon which passes the wrapping paper, a second roller to cooperate therewith to feed the wrapping paper, a tensioning member resting in a loop of the wrapping paper, and clutch means, actuated by said tensioning member, for moving the second mentioned roller to and from the rotary roller, for the purpose described.

4. In a machine as claimed in claim 1, a feeler device cooperating with the prints fed through the machine and adapted to control the means delivering the wrapping paper, for the purpose described.

5. A machine for wrapping prints in a closed band, comprising, gripping means arranged in two rows to feed the prints step by step, means for imparting a reciprocatory movement of translation to these gripping means, means for opening said gripping means at the end of each forward stroke and for closing said gripping means upon a print at the end of each backward stroke, means for delivering the wrapping paper, said delivering means comprising, means adapted to deliver a fixed length of paper in a plane perpendicular to the plane of feed of the prints in front of each print, and other means adapted to deliver a further fixed length of paper, arranged to cooperate with the print which has been fed by the gripping means, and to surround this print from below and from above, means for cutting the paper, means for coating one of the free ends of the paper with adhesive material, means for tensioning the band of paper around the print, means for bending one of the free ends of the paper over the other end and to produce the sticking of the paper at the part coated with adhesive material, together with labelling means controlled by one of the said tensioning means, for the purpose described.

In testimony whereof I have signed my name to this specification.

JEAN MARCEL REGESTER DUPLAY.